US012146299B2

(12) United States Patent
Tagalpallewar et al.

(10) Patent No.: US 12,146,299 B2
(45) Date of Patent: Nov. 19, 2024

(54) SYSTEM AND METHOD PROVIDING OVERLAYS FOR ASSISTING COUPLING LOADERS WITH IMPLEMENTS

(71) Applicant: Deere & Company, Moline, IL (US)

(72) Inventors: Nikhil D. Tagalpallewar, Kinwat (IN); Gopal M. Goenka, Pune (IN); Bharat J. Joshi, Pune (IN); Vishwanath V. Patil, Pune (IN)

(73) Assignee: Deere & Company, Moline, IL (US)

( * ) Notice: Subject to any disclaimer, the term of this patent is extended or adjusted under 35 U.S.C. 154(b) by 304 days.

(21) Appl. No.: 17/725,032

(22) Filed: Apr. 20, 2022

(65) Prior Publication Data
US 2023/0340757 A1 Oct. 26, 2023

(51) Int. Cl.
E02F 9/26 (2006.01)
B60K 35/00 (2024.01)
(Continued)

(52) U.S. Cl.
CPC ............... *E02F 9/26* (2013.01); *B60K 35/00* (2013.01); *B62D 49/065* (2013.01);
(Continued)

(58) Field of Classification Search
CPC ..... E02F 9/26; E02F 3/96; E02F 9/265; E02F 3/3609; B60K 35/00; B60K 35/28;
(Continued)

(56) References Cited
U.S. PATENT DOCUMENTS
6,765,607 B2 7/2004 Mizusawa et al.
6,970,184 B2 11/2005 Hirama et al.
(Continued)

FOREIGN PATENT DOCUMENTS
FR 3033053 A1 8/2016
WO 2017207522 A1 12/2017

OTHER PUBLICATIONS

Extended European Search Report and Written Opinion issued in European Patent Application No. 23166423.6, dated Aug. 23, 2023, in 06 pages.
(Continued)

*Primary Examiner* — Hussein Elchanti
*Assistant Examiner* — Oliver Tan
(74) *Attorney, Agent, or Firm* — Tucker Ellis LLP

(57) ABSTRACT

A virtual guidance apparatus assists movement of a loader for connection of a tool carrier with an implement. A vision sensor device generates implement image data representative of an image of an implement adjacent to the tractor. Based on the implement image data relative difference data is generated representative of a relative position between an implement attachment feature that is mutually coupleable with a corresponding carrier attachment feature for coupling the tool carrier with the implement. Based on the relative difference data, alignment guidance data is generated representative of an incremental movement for moving the loader relative to the implement. A visual movement instruction is displayed based on the implement image data and the alignment guidance data superimposed on a viewable image of the implement. The visual movement instruction provides instructions to the operator for moving the loader relative to the implement for coupling the tool carrier with the implement.

18 Claims, 7 Drawing Sheets

(51) Int. Cl.
    *B60K 35/22*     (2024.01)
    *B60K 35/28*     (2024.01)
    *B62D 49/06*     (2006.01)
    *E02F 3/96*      (2006.01)
    *G05D 1/00*      (2024.01)

(52) U.S. Cl.
    CPC ............ *G05D 1/0044* (2013.01); *B60K 35/22* (2024.01); *B60K 35/28* (2024.01); *B60K 2360/162* (2024.01); *E02F 3/96* (2013.01)

(58) Field of Classification Search
    CPC ............ B60K 2360/162; B60K 35/22; B62D 49/065; G05D 1/0044; B60R 1/00; B60R 2300/308; A01B 71/063; B60D 1/36
    See application file for complete search history.

(56) References Cited

U.S. PATENT DOCUMENTS

| | | | |
|---|---|---|---|
| 7,752,778 B2 | 7/2010 | Schoenmaker et al. | |
| 7,797,860 B2 | 9/2010 | Schoenmaker et al. | |
| 9,139,977 B2 | 9/2015 | McCain et al. | |
| 10,106,072 B2 | 10/2018 | Liñan et al. | |
| 10,132,060 B2 | 11/2018 | Forcash et al. | |
| 10,351,061 B1 * | 7/2019 | Chaudhari | B60R 1/003 |
| 11,401,684 B2 | 8/2022 | Berry et al. | |
| 11,580,383 B2 * | 2/2023 | Ishii | G06N 3/084 |
| 2002/0059075 A1 | 5/2002 | Schick et al. | |
| 2002/0125018 A1 * | 9/2002 | Bernhardt | A01B 59/068 172/439 |
| 2004/0054457 A1 | 3/2004 | Kormann | |
| 2014/0146167 A1 | 5/2014 | Friend et al. | |
| 2014/0151979 A1 | 6/2014 | Puckett et al. | |
| 2016/0312432 A1 * | 10/2016 | Wang | E02F 9/2012 |
| 2018/0245316 A1 | 8/2018 | Forcash et al. | |
| 2019/0009817 A1 | 1/2019 | Bradley et al. | |
| 2020/0019182 A1 * | 1/2020 | Ling | B60D 1/62 |
| 2020/0363815 A1 | 11/2020 | Mousavian et al. | |
| 2021/0043085 A1 * | 2/2021 | Kreiling | E02F 3/96 |
| 2021/0127550 A1 * | 5/2021 | Ohrstrom | A01B 69/006 |
| 2021/0301494 A1 | 9/2021 | Berry et al. | |
| 2022/0112696 A1 | 4/2022 | Sud et al. | |
| 2022/0332248 A1 | 10/2022 | Vazquez et al. | |
| 2022/0332249 A1 | 10/2022 | Vazquez et al. | |

OTHER PUBLICATIONS

Final Office Action mailed Feb. 15, 2024 for U.S. Appl. No. 17/230,093 (6 pages).

Non-Final Office Action mailed Oct. 30, 2023 for U.S. Appl. No. 17/230,093 (13 pages).

Final Office Action mailed Feb. 15, 2024 for U.S. Appl. No. 17/724,598 (6 pages).

Non-Final Office Action dated Oct. 27, 2023 for U.S. Appl. No. 17/724,598 (13 pages).

* cited by examiner

SYSTEM AND METHOD PROVIDING OVERLAYS FOR ASSISTING COUPLING LOADERS WITH IMPLEMENTS

FIELD OF THE DISCLOSURE

The embodiments herein are directed to methods and systems assisting an operator with coupling a loader of a work vehicle with an implement for efficient and safe vehicle and loader operation, and easy implement attachment. Although the example embodiments will be described as systems and methods for use in providing one or more visual alignment instructions as overlays, it is to be appreciated that the embodiments are not limited to those particular uses or applications, and instead may be used anywhere there is a desire to provide an operator with a visualization of equipment positioning for helping the operator to view relative positions between an implement manipulator and the implement so that the implement manipulator may be suitably moved into place relative to the implement for mutual coupling therebetween.

BACKGROUND

Many machines offer load manipulation that is outside of the strength and reach capabilities of the human body due for example to load size and the natural capacities or incapacities of human workers. Many machines use hydraulic boom mechanisms for example to couple with an attachment such as an implement, a tool or the like on the end of the boom that is then in turn used to lift or otherwise manipulate these heavy or large loads. In addition, some machines use such boom mechanisms with a tool carrier that adapts the boom for mutual coupling with a wide variety of tools, implements, or the like. In work vehicles such as tractors outfitted with such loaders, the tool carrier on the free end of the loader is typically provided with one or more attachment features such as one or more pins or the like and, correspondingly, the implement is similarly provided with one or more attachment features such as one or more hooks or the like. The pins and hooks may be selectively mutually coupled for attaching the implement onto the tool carrier on the end of the loader, and they may be similarly selectively mutually decoupled for disconnecting the implement from the tool carrier of the loader so that another different tool may be attached to the loader.

However, the boom device structures of the loader mechanisms can sometimes block or otherwise obstruct the tool carrier from the view of the operator. This makes it difficult for the operator to efficiently position the tool carrier on the boom of the vehicle relative to the implement in the ground plane for coupling the attachment features of the tool carrier with the corresponding attachment features of the implement. The attachment and the tool carrier may be laterally offset relative to each other, wherein an offset adjustment is needed in order to successfully couple the tool carrier with the attachment. In addition, the attachment and the tool carrier may be mutually inclined relative to each other, wherein an inclination adjustment is needed in order to successfully couple the tool carrier with the attachment.

For these reasons, work vehicle operators often need to execute multiple trials/iterations of loader and vehicle positioning in order to successfully attach the selected implement onto the loader.

Valuable operational time is therefore wasted by the operator performing these "pre-hooking" operations and, in particular, much time is wasted when the boom significantly or wholly blocks the tool carrier from the view of the operator.

It is therefore desirable to provide systems and methods for assisting an operator to maneuver a work vehicle and a boom mechanism of the work vehicle with a tool carrier on an end thereof, collectively referred to herein as a "loader," relative to an associated attachment such as a tool, implement, or the like for efficiently establishing a mutual coupling between the tool carrier and the attachment.

SUMMARY

The embodiments herein are directed to methods and systems providing assistance to an operator for assisting movement of a loader carried on an associated tractor for connection of a tool carrier of the loader with an implement for efficient and safe vehicle operation, material handling, and load manipulation. It is to be understood that material handling and manipulation includes changing material position such as picking up or laying down loads such as bales, pallets or the like, and boom attachment coupling such as when attaching an implement such as bucket or pallet fork to a carrier or receiver on the end of the boom of a loader. "Material handling" as used herein includes and is not limited to any and all operations were material or loads of any type are manipulated, moved, transported, and the like. Although the example embodiments will be described as methods and systems for providing assistance to an operator for assisting movement of a loader carried on an associated tractor for connection of a tool carrier of the loader with an implement, it is to be appreciated that the embodiments are not limited to those particular uses or applications, and instead may be used anywhere there is a need to provide an operator with a visualization of material handling attachments for helping the operator to view current positions of the loader and of the attachments intended to be coupled with a tool carrier of the loader as well as to visualize preferred or recommended paths for coupling these attachments and carrying a load using an attachment such as a tool or implement safely and efficiently.

The embodiments herein are directed to methods and systems assisting an operator to visualize and align portions of a loader of a work vehicle relative to material handling attachments intended to be detachably coupled to the loader, and to help visualize the position of one or more attachments on the loader and of material to be loaded or manipulated such as to approach a load and/or tool, and pick up the tool and/or the load using the tool.

In accordance with an aspect herein, a virtual guidance apparatus is provided for assisting movement of a loader carried on an associated tractor for connection of a tool carrier of the loader with an implement. In accordance with an example, the apparatus includes a guidance control unit, a vision sensor device operatively coupled with the guidance control unit, and a display unit operatively coupled with the guidance control unit. The guidance control unit includes a processor, a memory device operatively coupled with the processor, and logic stored in the memory device. The vision sensor device is operable to generate implement image data representative of an image of an implement adjacent to the tractor. The display unit includes a screen that is viewable by an operator of the associated tractor. In the aspect, the processor is operable to execute the logic to generate, based on the implement image data, relative difference data representative of a relative position between an implement attachment feature of the implement that is mutually coupleable with a corresponding carrier attachment feature of the tool carrier for coupling the tool carrier of the loader with the implement. The processor is operable to further execute the logic to generate, based on the relative difference data, alignment guidance data representative of an incremental movement for moving the loader relative to the implement for mutually coupling the carrier and implement attachment features. In accordance with the aspect, the display unit is operable to display on the screen, based on the implement image data and the alignment guidance data, a visual movement instruction superimposed on a viewable image of the implement, the visual movement instruction providing instructions to the operator for moving the loader relative to the implement for coupling the tool carrier of the loader with the implement.

In an embodiment, the vision sensor device of the virtual guidance apparatus includes one or more vision sensor devices including for example one or more cameras. Each camera may be provided on a segment of an articulated boom. In particular and in accordance with an example embodiment, a camera is provided on the top of a cab of the work vehicle or at any other suitable position so that the tool carrier portion and each pivot joint and/or each degree of freedom of movement of an articulated boom may be visualized by the camera. The example embodiments described herein include for ease of description and understanding only a single camera for a loader having a single pivot or degree of freedom of movement.

In some embodiments an operator input comprises a touchscreen portion of the display unit or a pointer device operatively coupled with the guidance control unit, and the memory of the guidance control unit stores data corresponding to the boom position training signal received by the input during the training.

Other embodiments, features and advantages of the example embodiments for assisting an operator of a work vehicle to maneuver a loader of the work vehicle for handling of an attachment such as a tool or implement or the like by providing visual aids in the form of a visual movement instruction superimposed on a viewable image of the implement, wherein the visual movement instruction provides instructions to the operator for moving the loader relative to the implement for coupling the tool carrier of the loader with the implement. This helps the operator to guide operation of the loader to position a boom relative to level ground, to position a tool carrier relative to the boom, to show a preview of a path of the tool carrier, and to assist in positioning the tool carrier relative to an attachment for coupling the tool carrier with the attachment will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the disclosure are illustrated, which, together with a general descriptions given above, and the detailed description given below, serve to exemplify the embodiments of this disclosure.

DETAILED DESCRIPTION

In the following description reference is made to the accompanying figures which form a part thereof, and in which is shown, by way of illustration, one or more example embodiments of the disclosed systems and methods providing visual aids for loader positioning for coupling an attachment onto a tool carrier on a free end of the loader. Various modifications of the example embodiments may be contemplated by on of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" or "one or more of A, B, and/or C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

Figure 1:
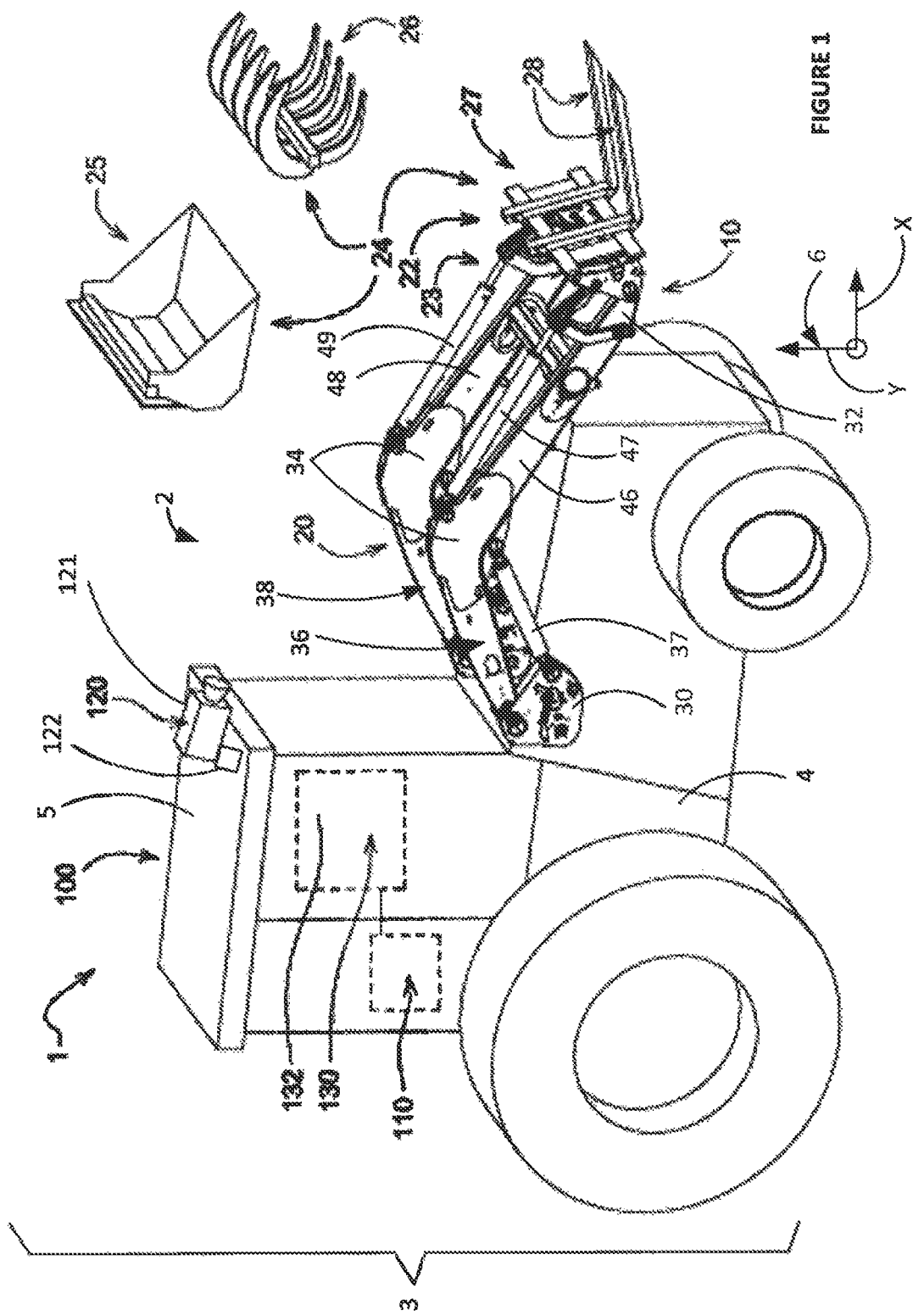
FIG. 1 is a side view of a work vehicle including a virtual guidance apparatus according to example embodiments of the present disclosure.

Referring now to the drawings, wherein the showings are only for the purpose of illustrating the example embodiments only and not for purposes of limiting the same, FIG. 1 illustrates a work vehicle 1 that may be used with the virtual guidance apparatus 100 according to example embodiments of the present disclosure. In the embodiment illustrated, the work vehicle 1 is a tractor 2 but it is to be appreciated that the embodiments herein are not limited to use with tractors or use with any particular mobile material handling equipment. For example, the work vehicle 1 may be a tractor without a cab such as for example an open station tractor, or a construction equipment work vehicle such as for example a construction loader. These are merely examples and the embodiments of the virtual guidance apparatus 100 described herein are adapted for operation in any work vehicle now known or hereinafter developed. The virtual guidance apparatus 100 of the example embodiments herein may execute or otherwise perform a virtual guidance method providing visual aids for loader positioning relative to an associated attachment such as for example a tool and/or implement for material handling according to examples of the present disclosure. The visual aids may include for example, a visual movement instruction superimposed on a viewable image of the implement displayed on a screen of a display unit, wherein the visual movement instruction provides instructions to the operator for moving the loader relative to the implement for coupling the tool carrier of the loader with the implement. In particular, the visual aids may include for example, a visual movement instruction superimposed on a viewable image of the implement, wherein a visual offset movement instruction is provided and a visual inclination movement instruction is provided. The visual offset movement instruction provides instructions to the operator for moving the loader laterally in a horizontal plane relative to the implement in directions perpendicular to a forward direction of the tractor for coupling the tool carrier with the implement in the horizontal plane. The visual inclination movement instruction provides instructions to the operator for moving the loader relative to the implement about a vertical axis perpendicular to the forward direction of the tractor for mutually coupling the carrier and implement attachment features.

To provide a useful, albeit non-limiting example, the virtual guidance apparatus 100 of the example embodiments is described below in conjunction with a particular type of work vehicle 1, shown in the form of a tractor 2, equipped with particular types of work implements 24 such as a pallet fork implement 27, a bucket implement 25, a grapple implement 26, etc. included in an front end loader (FEL) attachment. The following notwithstanding, it is emphasized that embodiments of the virtual guidance apparatus 100 may be deployed onboard various other types of work vehicles having one or more movable implements attached thereto. The virtual guidance apparatus 100 of the example embodiment shown includes an optical system 120 including for example a vision sensor device 121. The virtual guidance apparatus 100 may adjust physically and/or electronically one or more operational characteristics of the one or more imaging devices such as the optical system 120 including for example the vision sensor device 121, or other optical device(s) in response to movement of various different types of work implements without limitation. The virtual guidance apparatus 100 may be distributed as an integral part of a work vehicle, as an integral part of a loader 10 attachment or other module that may be removably attached to and detached from a work vehicle on an as-needed basis, or as a discrete assembly or multi-component kit that may be installed on an existing work vehicle via retrofit attachment.

The vision sensor device 121 may include one or more cameras operable to generate image data representative of an image of objects and background within the field of view of the one or more cameras. The cameras may be monocular cameras, stereo cameras, and may include for example devices that use optical sensing technology to determine the position, velocity, or other characteristics of objects in the field of view by analysis of pulsed laser light reflected from their surfaces. Such devices may use Light Detection and Ranging (LIDAR) technologies. In further addition, the vision sensor device 121 may include one or more cameras operable to generate image data representative of an image of objects and background within the field of view of the one or more cameras using Radio Detection and Ranging (RADAR) technologies, for example.

In some examples, the vision sensor device 121 can be mounted on the cab facing forwards toward the bucket, attachment, or other work tool. For example, the camera can be mounted on the front surface of the cab 5 or the top surface (e.g., roof) of the cab 5. The vision sensor device 121 can transmit images (or video signals) wirelessly to a display or though wiring that extends along an arm, boom, or other frame structure of the work vehicle to the display. In other examples, the camera can be mounted on an arm of the work vehicle, including the lower surface, upper surface, or sides of the arm structure used to support the bucket, attachment, or other work tool or device used during operation of the work vehicle. Alternatively, the camera can be mounted on a boom of the work vehicle, including the lower surface, upper surface, or sides of the boom that is commonly used to support the arm and is attached to the main body of the work vehicle. Still further the vision sensor device 121 may be mounted to the hood or in an area near the hood and/or anywhere else as may be necessary or desired to obtain suitable complete attachment image views in vehicles of other types such as for example open station tractors, harvesters, construction equipment loaders, etc.

FIG. 1 is a side perspective view of a tractor 2 including a front end loader 10 attachment and a virtual guidance apparatus 100, as illustrated in accordance with an example embodiment of the present disclosure. The virtual guidance apparatus 100 is only partially shown in FIG. 1 and an example embodiment of which will be described more fully below in conjunction with FIG. 2. First, however, a general description of the tractor 2 is provided to establish an example context in which the virtual guidance apparatus 100 may be better understood. In addition to the loader 10 attachment and the optical system 120, the tractor 2 includes a vehicle body 3 having a chassis 4, and a cab 5. The tractor 2 is generally bilaterally symmetrical about its longitudinal axis, which is parallel to the X-axis identified in FIG. 1 by coordinate legend 6.

In accordance with an example embodiment and as will be described in greater detail below, the visual offset movement instruction provides instructions to the operator for laterally moving the loader in the horizontal plane X relative to the implement in directions perpendicular to a forward direction of the tractor for mutually coupling the carrier and implement attachment features. The visual inclination movement instruction provides instructions to the operator for moving the loader relative to the implement about the vertical axis Y perpendicular to the forward direction of the tractor such as by steering the tractor to the left and/or right for mutually coupling the carrier and implement attachment features.

In the illustrated embodiment, the work vehicle 1 includes a loader 10 provided for material handling of an associated load. The loader 10 of the work vehicle 1 illustrated includes an articulated boom 20 having a tool carrier 22 on a free end 23 of the boom 20. The tool carrier 22 portion of the loader 10 may be for example a receiver mechanism or other similar device or apparatus provided on the free end 23 of the boom 20 for enabling coupling of an attachment such as an implement or a tool for example with the free end 23 of the boom 20. In this regard, the tool carrier 22 is selectively mutually connectable with one or more various attachments, tools or implements 24 such as for example a bucket implement 25, a grapple implement 26, a pallet fork implement 27 having a set of pallet tines 28, a gripper (not shown), a bail hugger (not shown), a bale spear (not shown), and/or various working devices as may be available and/or desired.

The articulated boom 20 of the loader 10 movably mounts the tool carrier 22 carrying a selected one of the one or more various attachments, tools or implements 24 to a forward portion of the vehicle body 3 and, more specifically, mounts the tool carrier 22 to chassis 4. In the illustrated example, the pallet fork implement 27 is shown attached with the tool carrier 22 but it is to be appreciated that the pallet fork implement 27 may be replaced by any different type of work implement, such as any of the bucket implement 25, the grapple implement 26, the gripper, the bail hugger, the bale spear, all as mentioned above, or any other work implement as necessary and/or desired, in alternative embodiments of the tractor 2. The articulated boom 20 assembly may assume any form capable of moving the work implement 24 relative the vehicle body 4 in response to operator commands. In the example embodiment shown in FIG. 1, the boom assembly 20 includes a system of linkages, hydraulic cylinders, plumbing lines (not shown), and other components suitable for this purpose. More specifically, the boom assembly 20 includes an aft bracket set 30 affixed to the vehicle body 4, a forward bracket set 32 to which the tool carrier 22 carrying the pallet fork implement 27 is pivotally attached, and an intermediate or mid bracket set 34 between the aft and forward bracket sets 30, 32. Twin lift arms 36, 38 pivotally attach the aft bracket set 30 with the mid bracket set 34, which is, in turn, attached with the forward bracket set 32 by twin implement arms 46, 48. Lift cylinders 37, 39 (only one of which can be seen) are further coupled between the aft bracket set 30 and the mid bracket set 34, while bucket cylinders 47, 49 are coupled between the mid bracket set 34 and the forward bracket set 33.

In the example embodiment the vision sensor device 121 is mounted on the cab facing forwards toward the bucket, attachment, or other work tool so that all of the lift arms 36, 38, the implement arms 46, 48, the aft, mid, and forward bracket sets 30, 34, 32, and any implements attached with the boom are within the field of view of the imaging system 120. Additionally, embodiments the virtual guidance apparatus 100 may adjust one or more operational characteristics of one or more imaging devices such as an optical system 120 including for example a vision sensor device 121, or other optical device(s) in response to movement of various different types of work implements without limitation for this purpose. In embodiments of the subject virtual guidance apparatus or controller 100 operable with associated work vehicles having a different configuration, the vision sensor device 121 may be mounted at other locations such as on the hood of open station tractors, and on other areas of construction loaders, for example.

The loader 10 attachment further includes other features, such as hydraulic lines and control valves, which are not shown in FIG. 1 for simplicity. When the loader 10 is mounted to the vehicle body 4, the hydraulic lines of the loader 10 are fluidly connected to a pressurized hydraulic fluid supply on the tractor 2 in a manner permitting an operator seated within the cab 5 to control the cylinders 37, 39, 47, and 49. Beginning from a ground position, an operator may command the boom assembly 20 of the loader 10 to lift the pallet fork implement 27 or any other implements carried on the tool carrier 22 as shown by controlling the lift cylinders 37, 39 to extend. As the lift cylinders 37, 39 retract, the boom 20 comprising the pallet fork implement 27 carried on the tool carrier 22 is lowered from a full height position to a lowered position. In the process of moving from the full height position to the lowered position, the boom 20 travels through the intermediate or mast level position shown in FIG. 1. Similarly, as the bucket cylinders 47, 49 extend in response to operator commands, the boom assembly 20 tilts the pallet fork implement 27 carried on the tool carrier 22 from the upright position through an intermediate position to the forward-facing lift position. Conversely, the operator may control the boom assembly 20 to stroke cylinders 37, 38, 47, 48 in a manner opposite to that just described to return the pallet fork implement 27 from the grounded, forward-facing lift position to the raised full height position shown in FIG. 3.

It is to be appreciated that the motion of the cylinders 37, 39, 47, and 49 may be controlled directly by operator manipulation of various levers, pedals and/or other human interface device(s) operatively coupled with hydraulic control components of the system, and further that the motion of the loader 10 may be indirectly controlled by the operator rendering motion commands to via the virtual guidance apparatus 100 which in turn may operate the various hydraulic control components of the system for moving the cylinders 37, 39, 47, and 49 thereby effecting the desired movement of the loader 10. It is still further to be appreciated that the motion of the cylinders 37, 39, 47, and 49 may be controlled by the virtual guidance apparatus 100 automatically and/or semi-automatically in response to generalized operator commands such as for example return to position (RTP) commands wherein for example the virtual guidance apparatus 100 may function in an RTP mode to automatically return the boom 20 overall, portions of the boom 20 such as for example the lift arms 36, 38 and/or the implement arms 46, 48, the various attachments, tools or implements 24 carried on the tool carrier 22, to one or more pre-stored position(s) in response to operator input.

In the example embodiment shown in the Figures, the implements 24 are moved by the boom 20 along a vertical plane containing or parallel to the longitudinal axis of the body 4 of the tractor 2 (corresponding to an X-Y plane in coordinate legend 6). The optical system 120 thus need only have a field of view (vertical in the example embodiment) rotatable about a single rotational axis to remain trained on the implements 24 throughout the range of motion of the loader 10 relative to the body 4 of the tractor 2. For the vision sensor device 121 shown this rotational axis is parallel to the lateral axis of the tractor 2; a "lateral axis" of the tractor 2 (or other work vehicle) defined as an axis extending within a horizontal plane (an X-Z plane in coordinate legend 6) and perpendicular to the longitudinal axis of the tractor 2. Stated differently, a lateral axis of tractor 2 is parallel to the Z-axis in coordinate legend 6, and vision sensor device 121 may be selectively rotatable in a further example embodiment about a rotational axis likewise parallel to the Z-axis, although in the example embodiment described herein the vision sensor device 121 remains fixed relative to the work vehicle 1 and in particular relative to the cab 5 of the tractor 2 and, as such remains fixed relative the a rotational axis likewise parallel to the Z-axis. In other embodiments wherein the virtual guidance apparatus 100 is deployed onboard a work vehicle including a backhoe or other implement that is rotatable about a horizontal axis (corresponding to the Y-axis in coordinate legend 6), the vision sensor device 121 or other optical device or optical devices included within the virtual guidance apparatus 100 may be selectively rotatable about multiple axes including an axis parallel to the horizontal axis.

The vision sensor device 121 or other optical device or devices included with the virtual guidance apparatus 100 may also be imparted with additional degrees of freedom in further embodiments. For example, the vision sensor device 121 may be moved to translate along any axis in three dimensional space, as appropriate to better visually capture the pallet fork implement 27 or other implement 24 throughout its full range of motion relative to the body 4 of the tractor 2. For example, and as may be appreciated, the vision sensor device 121 may be mounted on a telescopic post 122 that extends vertically upward when the pallet fork implement 27 or other implement 24 is moved into the full height position to provide a better vantage point for observation of markers on the pallet fork implement 27 or other implement 24 as will be described below to minimize the degree to which the boom assembly 20 visually obstructs the camera's view of the pallet fork implement 27 or other implement 24. In addition, the virtual guidance apparatus 100 may electronically adjust one or more operational characteristics of the one or more imaging devices such as the optical system 120 including for example the vision sensor device 121, or other optical device(s) in response to movement of various different types of work implements without limitation to minimize the degree to which the boom assembly 20 visually obstructs the camera's view of the pallet fork implement 27 or other implement 24.

The articulated boom 20 may be maneuvered such as by actuating various hydraulic cylinders 37, 39, 47, 49 to extend or retract and to lower or raise an articulated boom 20 relative to the work vehicle so that the tool carrier 22 may be positioned for coupling the boom 20 with the one or more various implements 24. The tool carrier 22 disposed on the end of the boom 20 collectively forms a loader 10 in accordance with the example embodiments. In an example embodiment herein, the one or more various implements 24 may be initially considered as a workpiece prior to being coupled with the tool carrier 22 of the loader 10 wherein an operator may desire for the one or more various implements 24 and the tool carrier 22 to be mutually latched joined or otherwise mechanically coupled prior to performing a material handling task or the like. As an example, an operator may wish to couple the pallet fork implement 27 with the tool carrier 22 prior to proceeding to approach, lift, and place a palletized load at a desired location. The visual aids described herein are developed by the system and provided to the operator of the associated work vehicle 1 for assisting in properly locating the tool carrier 22 on the free end 23 of the boom 20 at a desired height relative to the ground, and also for providing further visual aids for assisting in properly raising, lowering and/or tilting the tool carrier 22 to a desired orientation or inclination for enabling coupling of the carrier 22 with the selected attachment 24, and further for positioning the work vehicle 1 relative to the selected implement 24 for moving the vehicle 1 supporting the tool carrier 22 into a coupling relationship with the selected implement 24 for mutually connecting attachment features of the tool carrier 22 with corresponding attachment features of the selected implement 24.

In addition, the visual aids described herein are developed by the system and provided to the operator of the associated work vehicle 1 for properly locating the tool carrier 22 on the free end 23 of the boom 20 at a desired height relative to the ground for training the system for RTP operation, and also for providing further visual aids for assisting in properly raising, lowering and/or tilting the tool carrier 22 to a desired orientation or inclination for enabling coupling of the carrier 22 with the selected attachment 24 for training the system for the RTP operation, and further for positioning the work vehicle 1 relative to the selected implement 24 for moving the vehicle 1 supporting the tool carrier 22 into a coupling relationship with the selected implement 24 for mutually connecting the tool carrier 22 with the selected implement 24 for training the system for the RTP operation.

In accordance with an example embodiment, the virtual guidance apparatus 100 includes a guidance control unit 110, an optical system 120 such as a camera device 121 mounted on the associated work vehicle 1 and operatively coupled with the guidance control unit 110, and a display unit 130 operatively coupled with the guidance control unit 110. As appearing herein, the term "camera device" refers to an optical device, a camera system, electrical light, or other device that generates and/or detects visible light or other electromagnetic radiation. The vision sensor device 121 may include one or more cameras operable to generate image data representative of an image of objects and background within the field of view of the one or more cameras. The cameras may be monocular cameras, stereo cameras, and may include for example devices that use optical sensing technology to determine the position, velocity, or other characteristics of objects in the field of view by analysis of pulsed laser light reflected from their surfaces. Such devices may use Light Detection and Ranging (LIDAR) technologies. In further addition, the vision sensor device 121 may include one or more cameras operable to generate image data representative of an image of objects and background within the field of view of the one or more cameras using Radio Detection and Ranging (RADAR) technologies, for example. The guidance control unit 110 includes a processor 204 (FIG. 2) and a memory device 210 (FIG. 2) operatively coupled with the processor in a manner to be described in greater detail below. The memory device 210 stores visual aid logic 211 (FIG. 2) executable by the processor 204 to provide virtual guidance for assisting an operator of the work vehicle to maneuver the loader 10 to a desired position relative to the work vehicle and relative to the ground, and for providing virtual guidance assistance for material handling of a workpiece such as and including during approaching and attaching the carrier 22 with a selected implement 24, and during picking up and dropping off and/or placement of a load in accordance with the example embodiments. The memory device 210 also stores visual aid data 213 (FIG. 2) that may be generated with operator assistance or input and then used for generating one or more virtual alignment target images on a display screen based on the visual aid data. In accordance with an example embodiment, the visual aid data 213 may comprise an implement database comprising a first implement data set correlating a first implement type of a first implement with first attachment feature location data representative of one or more locations of one or more physical implement attachment features of the first implement, and a second implement data set correlating a second implement type of a second implement with second attachment feature location data representative of one or more locations of one or more physical implement attachment features of the second implement. The implement database may comprise a plurality of implement data sets correlating a corresponding plurality of implement types with attachment feature location data representative of one or more locations of one or more physical implement attachment features of the plurality of implements.

The display unit 130 can be positioned in the cab 5 or elsewhere in or on the work vehicle. The display unit 130 can be positioned so as to be viewable by the operator while the operator manipulates the work vehicle's controls to perform a task. And the display unit 130 can be positioned so as not to hinder the opening or closing of any latches, hatches, windows, or doors in the cab. In some examples, the display can be mounted on the exterior of the cab 5, such as to a rollover protection structure (ROPS), via a mounting device. This can enable the operator to view the display while operating the controls of the work vehicle. In other examples, the display unit 130 can be positioned in the cab 5, for example, by using a vertical support pillar that forms the structure of the ROPS. The vertical support pillar can be located in front of the operator or behind the operator while the operator is seated in the cab 5. Additionally or alternatively, the display unit 130 can be positioned in the cab using a cross member that spans across a vertical support pillar. The cross member can be positioned in front of, behind, or on the sides of the operator while the operator is seated in the cab 5. The display unit 130 can additionally or alternatively be positioned on a supporting structure inside the cab 5 for the controls (e.g., pilot controls) used to operate the work vehicle 1. The controls can control the rotation of the work vehicle 1; the boom 20, arm, or work tool 24; or any combination of these. In some examples, the display unit 130 can be an existing monitor in the work vehicle that typically shows other information, such as operating parameters (e.g., engine speed, fuel level, and engine temperature) of the work vehicle. In such an example, the monitor may be modified to perform the functionality of the display unit 130.

The camera device 121 of the virtual guidance apparatus 100 is operable to obtain an image of the loader 10 of the associated work vehicle 1 and to generate loader image data representative of the obtained image of the loader 10. The display unit 130 is operatively coupled with the guidance control unit 110, and receives the loader image data and the visual aid data 213. The display unit 130 displays on a screen 132 of the display unit that is viewable by the user from a user station of the associated work vehicle 1 a viewable image 10' (FIGS. 6A-6C and 8A-8C) of the loader 10 of the associated work vehicle based on the loader image data. The display unit 130 also displays on the screen 132 a first virtual alignment target image based on the visual aid data 213. In the example embodiment, the first virtual alignment target image is dynamically rendered on the screen 132 superimposed over the dynamic viewable image 10' of the loader, and superimposed on the viewable image 24' of the implement 24 and the viewable image 22' of the tool carrier 22. The first virtual alignment target image is representative of a first selectable target location on the screen 132 for alignment of a first visual marker portion of the viewable image of the loader.

It is to be appreciated that although only a single camera device 121 is shown for ease of illustration mounted to the work vehicle 1 at the position shown, the camera device 121 shown is merely representative of a set of one or more cameras that may include several connected cameras that can be mounted on or near the vehicle or anywhere as may be necessary or desired such as for example on other areas of the work vehicle or on portions of the loader itself in order to obtain as many images of the tool carrier and/or on the tool carrier as may be necessary and/or desired for providing images of the tool carrier over the full relevant range of movement or motion of the loader.

Figure 2:
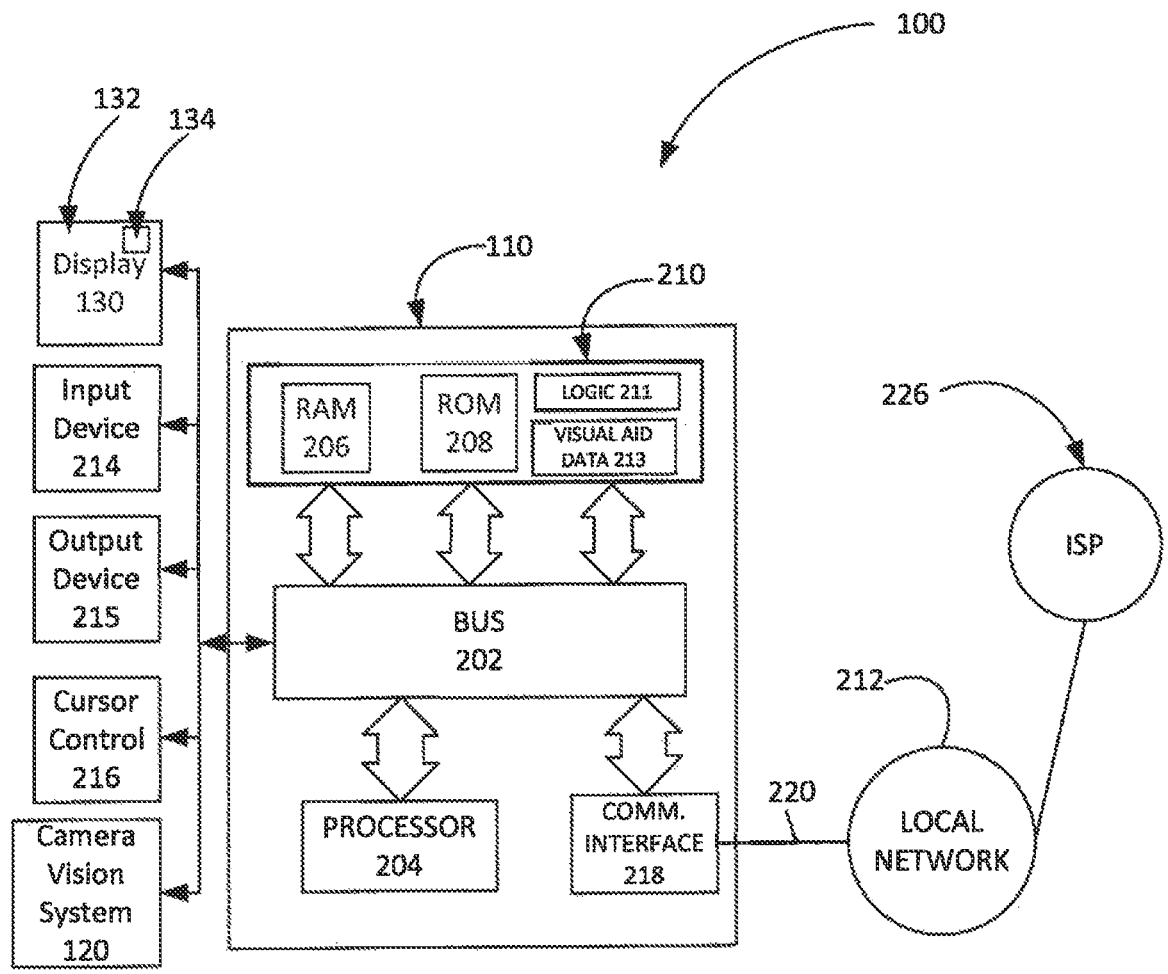
FIG. 2 is a block diagram that illustrates a representative virtual guidance apparatus according to the example embodiments.

FIG. 2 is a block diagram that illustrates a representative virtual guidance apparatus or controller 100 according to the example embodiments. The controller is suitable for executing embodiments of one or more software systems or logic modules that perform the virtual guidance method for assisting an operator of an associated work vehicle to maneuver portions of the associated work vehicle for connection of a tool carrier of the loader with an implement according to the subject application, when maneuvering the loader to couple an implement onto a tool carrier on the free end of a boom of the loader, when maneuvering the vehicle with the attached implement prior to picking up the implement, and for efficient and safe material handling and load manipulation when picking up the implement.

The example system includes a bus 202 or other communication mechanism for communicating information, and a processor 204 coupled with the bus for processing information. The computer system includes a main memory device 210, such as random access memory (RAM) 206 or other dynamic storage device for storing information and instructions to be executed by the processor 204, and read only memory (ROM) 208 or other static storage device for storing static information and instructions for the processor 204. A storage device 210 is also suitably provided for storing visual aid logic 211 comprising instructions for execution by the processor, and other information including for example data and instructions for execution by the processor for obtaining and displaying visual aids on a screen of the display unit that is viewable from an operator's seat of the associated work vehicle. The visual aids are displayed for helping to guide the user in operating the loader to position a boom relative to the work vehicle, to position the boom relative to level ground, to position the tool carrier 22 on the free end 23 thereof relative to the one or more various attachments or implements 24 to be coupled with the carrier 22, to position the one or more various attachments or implements 24 relative to the boom and/or relative to the ground. The storage device 210 may further store visual aid data 213 used for generating in the example embodiment one or more static virtual alignment target images superimposed on a dynamic viewable image of the loader displayed on the screen 132, wherein the one or more virtual alignment target images displayed on the screen 132 are representative of selectable target locations on the screen 132 for alignment of visual marker portions of the viewable image of the loader. The visual marker portions of the viewable image of the loader may be representative of images of one or more physical markers such as for example crosshair markers, manufacturer's logos, or the like that are provided on or at areas of the boom and/or on or at areas of the tool carrier on the end of the boom for example.

The example embodiments described herein are related to the virtual guidance apparatus or controller 100 performing a method providing visual aids that assist an operator of an associated work vehicle to maneuver a loader of the associated work vehicle to couple an implement or other attachment onto a tool carrier of the loader. According to one implementation, information for the visual aids to be displayed on the screen of the display unit in the form herein of visual offset movement instructions and visual inclination movement instructions are provided by the virtual guidance apparatus or controller 100 in response to the processor 204 executing the visual aid logic 211 comprising one or more sequences of instructions of logic modules contained in main memory 206. Such instructions may be read into main memory 206 from another computer-readable medium, such as storage device 210. Execution of the sequences of the visual aid logic 211 instructions contained in storage device 210 and/or main memory 206 causes the processor 204 to perform the process steps described herein. In an alternative implementation, hard-wired circuitry may be used in place of or in combination with software instructions to implement the example embodiments. Thus implementations of the example embodiments are not limited to any specific combination of hardware circuitry, software, logic, or combinations of hardware, software, and/or logic.

In accordance with the descriptions herein, the term "computer-readable medium" as used herein refers to any non-transitory media that participates in providing visual aid logic 211 instructions to the processor 204 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The virtual guidance apparatus or controller 100 further includes a communication interface 218 coupled with the bus 202 which provides a two-way data communication coupling to a network link 220 that is connected to local network 212 such as for example a local network of the work vehicle 1 such as a Controller Area Network (CAN) bus or the like. The communication interface 218 may be a controller area network (CAN) card to provide a data communication connection to a compatible CAN bus. As another example, communication interface 218 may be a local area network (LAN) card to provide a data communication connection to a compatible LAN. For example, communication interface 218 may be an integrated services digital network (ISDN) card or a modem to provide a data communication connection to a corresponding type of telephone line. Wireless links may also be implemented. In any such implementation, communication interface 218 may be a wireless receiver/transmitter, i.e. a transceiver operable to send and receive electrical, electromagnetic, radio frequency (RF), and/or optical signals that carry data streams such as digital data streams representing various types of information.

Network link 220 typically provides data communication through one or more networks to other data devices. For example, network link 220 may provide a connection through a local network to a diagnostic host computer (not shown) of the like for supporting configuration of the system as desired or necessary. An Internet Service Provider (ISP) 226 may provide data communication services indirectly through the Internet via the network 212 or directly through the network link 220.

The example virtual guidance apparatus or controller 100 can send messages and receive data, including program code, through the network(s), network link 220 and communication interface 218. In an Internet-connected example embodiment, the virtual guidance apparatus or controller 100 is operatively connected with a plurality of external public, private, governmental or commercial servers (not shown) configured to execute a web application in accordance with example embodiments. The example virtual guidance apparatus or controller 100 suitably includes several subsystems or modules to perform the virtual operator's guidance as set forth herein. A benefit of the subject application is to provide improved guidance by displaying offset and inclination movement guidance instructions on a screen 132 of a display unit 130 that is viewable from an operator's seat of the associated work vehicle for helping the operator to view current positions of the loader and tool mechanisms as well as to visualize preferred or recommended movements of the loader and tool carrier mechanisms to safely and efficiently couple the tool carrier with a tool to safely and efficiently attach the tool onto the tool carrier portion of the loader. An output device 215 may also be provided such as in the form of a sound generating device such as a speaker to help improve guidance assistance by generating audible guidance instructions in the form of audible instructions and/or suitable instructional noises such as beeps, voice messages or the like that can be heard from an operator's seat of the associated work vehicle for helping the operator to be alerted to current positions of the mechanisms as well as to be audibly instructed of preferred or recommended paths for movement of the loader and/or tool carrier mechanisms to safely and efficiently load, unload, or otherwise couple the desired implement 24 with the tool carrier 22, and also to handle the material using the implement 24 received onto the carrier 22.

The example embodiment of the virtual guidance apparatus further includes an input device 214 operatively coupled with the guidance control unit. The input device 214 may be used during a training of the virtual guidance apparatus for receiving a boom and tool carrier position training signal representative of the first predetermined target location alignment of the boom and tool carrier to establish a predetermined relative physical position between the tool carrier portion of the loader and a selected implement disposed on the ground adjacent to the associated work vehicle. In an example embodiment the input device 214 may include a touchscreen portion 134 of the display unit 130, a pointer device 216 operatively coupled with the guidance control unit, or any other device or means of communicating training and other information to the control unit 110 of the virtual guidance assist apparatus 100.

In an example embodiment during system training, the operator may first position the boom 20 and tool carrier 22 to a desired position relative to the selected implement, then drag and drop a virtual indicia movable on the touchscreen 134 using a pointer or finger onto a selected portion of the image of boom on the screen 132 while the boom and tool carrier are in their desired positions, wherein the virtual indicia comprises the boom position training signal representative of a selectable command on the screen for alignment of the boom and tool carrier to establish a desired relative physical position between the tool carrier and the selected implement.

In a further example embodiment, the virtual indicia may be a static image capture of the boom disposed in a selected desired position relative to the vehicle and/or relative to the ground wherein a subsequent superposition of the static captured image of the boom in the selected desired position with dynamic images of the boom being moved during use of the vehicle could be used to establish an accurate boom and tool carrier repositioning to the desired position upon movement of the boom to realize a coincidence of the dynamic boom image being displayed on the screen with the static boom target image also being displayed.

Further in an example embodiment, the operator may position the tool carrier 22 in a desired position relative to the boom 20, then drag and drop the virtual indicia movable on the touchscreen 134 onto a selected portion of the image of boom on the screen 132 while the tool carrier 22 is in a desired position relative to the boom 20, wherein the virtual indicia comprises the carrier position training signal representative of a selectable target location on the screen for alignment of the carrier target device in the viewable image of the loader to establish a desired relative physical position between the carrier portion of the boom and the vehicle, the ground supporting the associated work vehicle, and/or relative to the boom 20. In an example embodiment, the virtual indicia may be a crosshair for example. In a further example embodiment, the virtual indicia may be a visual symbol such as a logo, for example. In yet a further example, the virtual indicia may be a static image capture of the tool carrier 22 disposed in the desired position relative to the boom 20.

Figure 3:
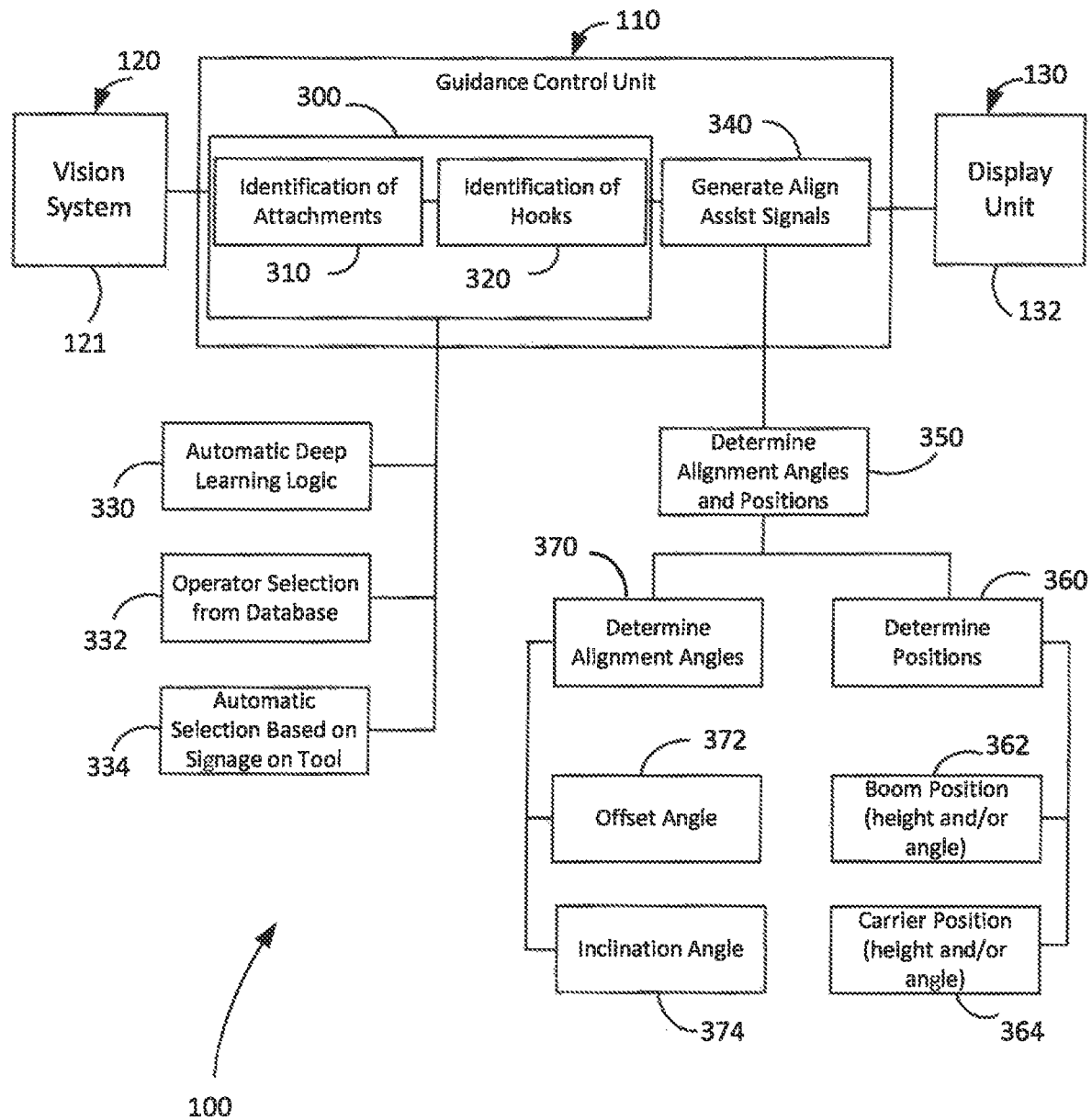
FIG. 3 is a functional block diagram showing the virtual guidance apparatus in accordance with an example embodiment.

FIG. 3 is a functional block diagram showing the virtual guidance apparatus 100 in accordance with an example embodiment. As shown the virtual guidance apparatus 100 includes a guidance control unit 110, a vision system 120 in the form in the example of a camera device 121, and a display unit 130 including a screen 132 that is viewable by an operator of the tractor. The camera device 121 is operable to generate implement image data representative of an image of an implement adjacent to the tractor.

In the example embodiment, the virtual guidance apparatus 100 is operable in the functional block 300 to identify 310 an attachment, and to identify 320 one or more attachment features such as hooks or the like on the attachment. He identification functional block 300 is also operative to identify one or more attachment features such as hooks or the like on the tool carrier that are selectively coupleable with the attachment features of the attachment. In addition, the virtual guidance apparatus 100 is functional to generate 340 one or more align assist signals for assisting movement of a loader carried on an associated tractor for connection of a tool carrier of the loader with an implement.

In the example embodiment, the processor 204 is operable in the function 300 to execute the logic 211 to generate relative difference data based on the implement image data received from the camera device 121, wherein the relative difference data is representative of a relative position between an implement attachment feature of the implement that is mutually coupleable with a corresponding carrier attachment feature of the tool carrier for coupling the tool carrier of the loader with the implement. Further in the example embodiment, the processor 204 is operable in the function 300 to execute the logic 211 generate alignment guidance data based on the relative difference data, wherein the alignment guidance data is representative of an incremental movement for moving the loader relative to the implement for mutually coupling the carrier and implement attachment features.

In the example embodiment shown in the Figure, the display unit 130 is operable to display on the screen 132, based on the implement image data and the alignment guidance data, a visual movement instruction 600, 800 (FIGS. 6A-6C and 8A-8C) superimposed on a viewable image 24' of the implement 24, wherein the visual movement instruction 600, 800 provides instructions to the operator for moving the loader 10 relative to the implement 24 for coupling the tool carrier 22 of the loader 10 with the implement 24. As will be described in greater detail below, the visual movement instructions comprise visual offset movement instructions representative of an incremental lateral movement for laterally moving the loader relative to the implement in directions perpendicular to a forward direction of the tractor ("X" in FIG. 1) for mutually coupling attachment features of the carrier with attachment features of the implement. In addition and as will further be described in greater detail below, the visual movement instructions comprise visual inclination movement instructions representative of an incremental inclination movement for moving the loader relative to the implement about a vertical axis ("Y" in FIG. 1) perpendicular to the forward direction of the tractor ("X" in FIG. 1) for mutually coupling the attachment features of the carrier with the attachment features of the implement.

Figure 8A:
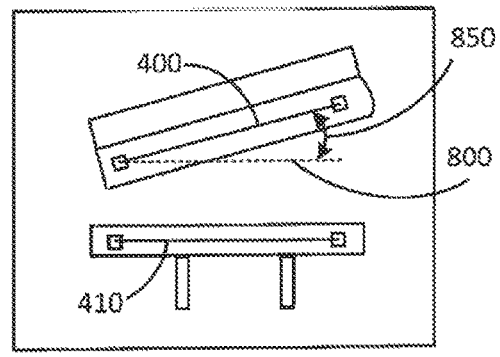
FIGS. 8A-8C are schematic illustrations of images of inclination movement instructions displayed for providing visual movement instructions assisting an operator to move the loader on the tractor shown in the situations of FIGS. 7A-7C, respectively, for coupling the implement with the tool carrier.
Figure 8B:
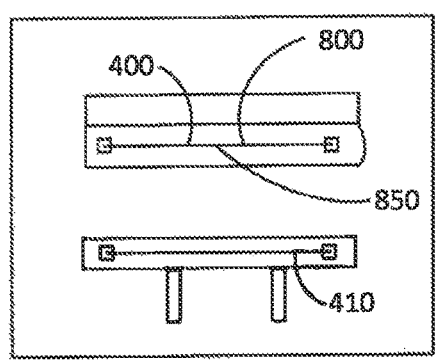
Figure 8C:
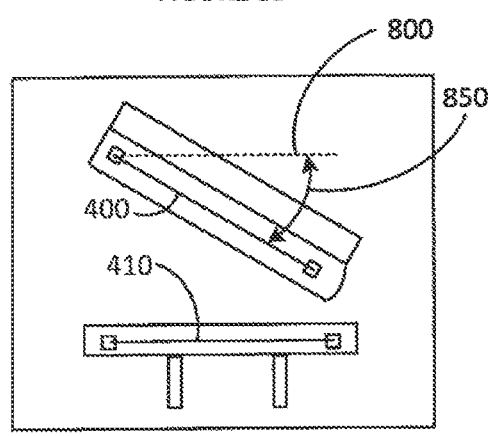

The processor 204 of the virtual guidance apparatus 100 is operable to execute the logic 211 to generate in function 340 the relative difference data, wherein the relative difference data comprising: i) offset angle data in function 372 representative of a relative lateral angle between the implement attachment feature and the carrier attachment feature, and ii) inclination angle data in function 374 representative of a relative inclination angle between the tool carrier of the loader and the implement. The processor 204 of the virtual guidance apparatus 100 is further operable to execute the logic 211 to generate, based on the offset angle data, offset guidance data representative of an incremental lateral movement for laterally moving the loader relative to the implement for mutually coupling the carrier and implement attachment features, and to generate, based on the inclination angle data, inclination guidance data representative of an incremental inclination movement for moving the loader relative to the implement about the vertical axis ("Y" in FIG. 1) perpendicular to the forward direction of the tractor ("X" in FIG. 1) for mutually coupling the attachment features of the carrier with the attachment features of the implement. The display unit 130 is operable to display on the screen 132, based on the implement image data, the offset angle data, and the inclination guidance data, a visual offset movement instruction 600 (FIGS. 6A-6C) and a visual inclination movement instruction 800 (FIGS. 8A-8C). In the example embodiment, the visual offset movement instruction 600 provides instructions to the operator for moving the loader laterally in a horizontal plane relative to the implement for coupling the tool carrier with the implement in the horizontal plane. In this case the operator would of course need to move the work vehicle such as by steering the vehicle to an appropriate position relative to the attachment, and the visual offset movement instruction provides information to the operator the extent to which the tool carrier and the attachment are mutually laterally offset. Also in the example embodiment, the visual inclination movement instruction 800 provides instructions to the operator for moving the loader to rotate about a vertical axis perpendicular to the horizontal plane such as by steering the tractor to the left and/or right for coupling the tool carrier with the implement in the vertical plane.

In an example embodiment, the alignment angles and positions are determined in 350. In particular, the alignment angles are determined in functional block 370 wherein the determination of the alignment angles includes determining offset angles in functional block 372 and inclination angles in functional block 374.

Also in the example embodiment, the display unit 130 is operable to display the visual offset movement instruction 600 on a portion of the screen between the viewable image 24' of the implement 24 and a viewable image 22' of the loader 22, and the display unit 130 is operable to display the visual inclination movement instruction 800 on the screen 132 superimposed on the viewable image 24' of the implement 24.

In the example embodiment, the virtual guidance apparatus 100 is functional 300 to identify 310 an attachment, and to identify 320 one or more attachment features such as hooks or the like on the attachment using an automatic deep learning function 330. In this example, the camera device 121 is operable to generate the implement image data, wherein the implement image data comprises implement attachment feature data representative of an image of the implement attachment feature of the implement, and the processor 204 is operable to execute the logic 211 to automatically detect the implement attachment feature of the implement relative to the camera device based on the implement attachment feature data of the implement image data, and to automatically generate, based on the automatically detected implement attachment feature, the alignment guidance data representative of the incremental movement for moving the loader relative to the implement for mutually coupling the carrier and implement attachment features.

Further in this example, the logic 211 stored in the memory device 210 comprises a deep learning detection model, and the processor 204 is operable to execute the deep learning detection model to automatically detect the implement attachment feature of the implement relative to the camera device based on the implement attachment feature data of the implement image data.

The deep learning detection model may comprise, for example, a deep learning neural network for object detection including for example for detection of the one or more attachment features on the implement.

The deep learning detection model may comprise, for example, a pre-build build model such as for example, Resnet, Mobilnet, InceptionV2, or the like.

In a further example embodiment, the virtual guidance apparatus 100 is functional 300 to identify 310 an attachment, and to identify 320 one or more attachment features such as hooks or the like on the attachment using a functional operation 332 to receive a selection from an operator of attachment information from a database stored in the memory device 210. The guidance control unit in this example embodiment includes an implement database stored in the memory device, wherein the implement database includes a first implement data set correlating a first implement type of a first implement with first attachment feature location data representative of one or more locations of one or more physical implement attachment features of the first implement, and a second implement data set correlating a second implement type of a second implement with second attachment feature location data representative of one or more locations of one or more physical implement attachment features of the second implement. The guidance control unit is operable to receive an implement identification signal, wherein the implement identification signal being representative of an identity of the implement. The processor is operable to execute the logic to select, based on the implement identification signal corresponding to a one of the first or second implement types, a corresponding one of the first or second implement data sets from the implement database, and to automatically generate, based on the implement image data and on the first or second attachment feature location data corresponding to the selected one of the first or second implement data sets, the alignment guidance data representative of the incremental movement for moving the loader relative to the implement for mutually coupling the carrier and implement attachment features.

In an example embodiment the input device 214 may include a touchscreen portion 134 of the display unit 130, a pointer device 216 operatively coupled with the guidance control unit, or any other device or means of communicating training and other information to the control unit 110 of the virtual guidance assist apparatus 100. The operator interface is operable to receive an implement selection signal from an operator of the tractor, and to generate the implement identification signal corresponding to the received implement selection signal.

In a further embodiment, the selection of information from the database is made based on signage carried on the implement. In this connection, the processor is operable to execute the logic to detect, based on the implement image data, identification indicia carried on the implement, and to determine the detected indicia being representative of a one of the first or second implement types. The logic is further executable to select, based on the detected indicia being determined to be representative of a one of the first or second implement types, a corresponding one of the first or second implement data sets from the implement database, and to automatically generate, based on the implement image data and on the first or second attachment feature location data corresponding to the selected one of the first or second implement data sets, the alignment guidance data representative of the incremental movement for moving the loader relative to the implement for mutually coupling the carrier and implement attachment features.

Figure 4:
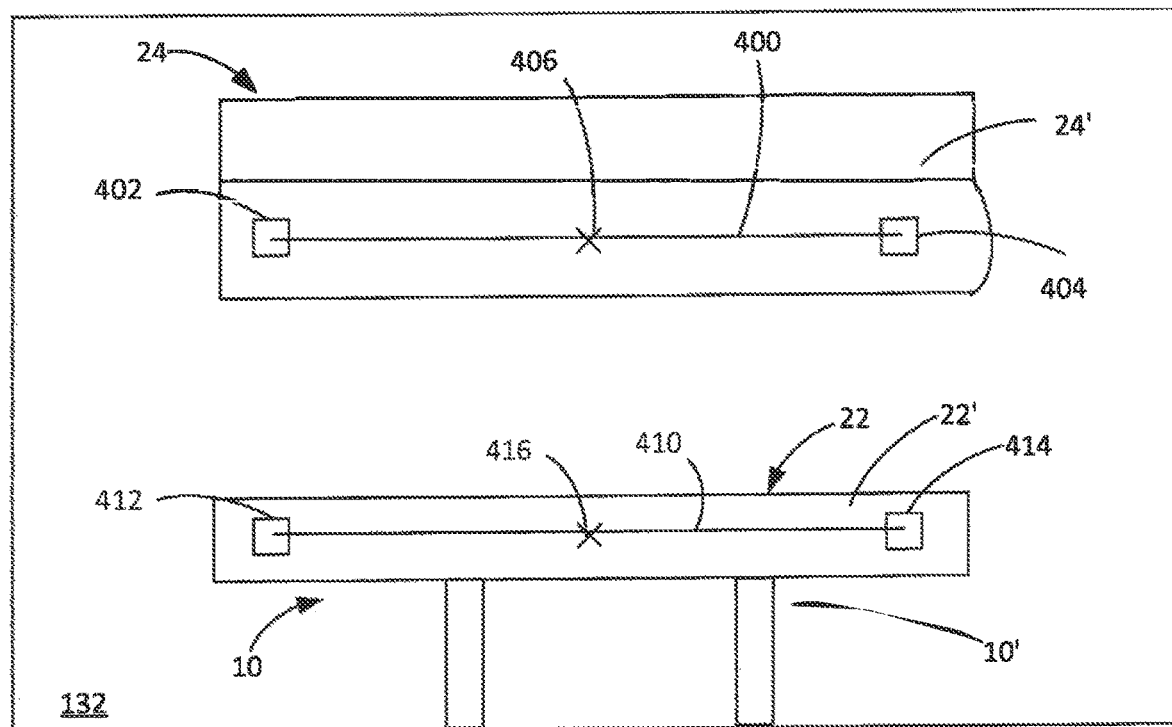
FIG. 4 is a schematic view of an image of a loader and a tool carrier showing virtual static lines formed thereon used in an example embodiment for generating visual offset and alignment movement instructions to be overlaid on the image of the loader and tool carrier.

In a still further example embodiment, the virtual guidance apparatus 100 is functional 300 to identify 310 an attachment, and to identify 320 one or more attachment features such as hooks or the like on the attachment using an automatic selection 334 based on information received into the guidance control unit 110 and obtained from information contained on signage carried on the associated implement. By way of example, the signage may comprise a bar code, a QR code, or the like, or any signage that may embed information into markings formed by the signage. The processor is operable to execute the logic to detect, based on the implement image data, implement information indicia carried on the implement, and to determine, based on detecting the implement information indicia, attachment feature location data representative of one or more locations of one or more physical implement attachment features of the implement. The processor is operable to execute the logic to automatically generate, based on the implement image data and on the attachment feature location data, the alignment guidance data representative of the incremental movement for moving the loader relative to the implement for mutually coupling the carrier and implement attachment features FIG. 4 is a schematic view of an image of a loader and a tool carrier showing virtual static lines formed thereon used in an example embodiment for generating visual offset and alignment movement instructions to be overlaid on the image of the loader and tool carrier. With reference to FIG. 4 and with continued reference to FIG. 3, in an example embodiment, the alignment angles and positions are determined in 350. In particular, the alignment angles are determined in functional block 370 wherein the determination of the alignment angles includes determining offset angles in functional block 372 and inclination angles in functional block 374. In further addition, the relative position of the implement is determined in functional block 362, and the relative position of the tool carrier is determined in functional block 364.

The relative positon of the implement as determined in functional block 362 is represented on the screen 132 shown in FIG. 4 as a attachment static line 400 (static relative to the image 24' of the attachment 24) extending between spaced apart attachment features 402, 404 on the implement. The attachment static line 400 is represented in the example embodiment having a center point 406. Similarly, the relative position of the tool carrier as determined in functional block 364 is represented on the screen 132 shown in FIG. 4 as a tool carrier static line 410 (static relative to the image 22' of the tool carrier 22) extending between spaced apart attachment features 412, 414 on the tool carrier. The tool carrier static line 410 is represented in the example embodiment having a center point 416.

As will be described below, the display unit is operable to display the visual offset movement instruction 600 (FIGS. 6A-6C) on the screen superimposed on the viewable 24' image of the implement 24 with the visual offset movement instruction 600 extending between the attachment static line 400 on the image 24' of the implement and the tool carrier static line 410 on the image 22' of the tool carrier 22. In particular, the display unit is operable to display the visual offset movement instruction 600 (FIGS. 6A-6C) on the screen superimposed on the viewable 24' image of the implement 24 with the visual offset movement instruction 600 extending between the center point 406 of the attachment static line 400 on the image 24' of the implement and the center point 416 on the tool carrier static line 410 on the image 22' of the tool carrier 22.

Figure 5A:
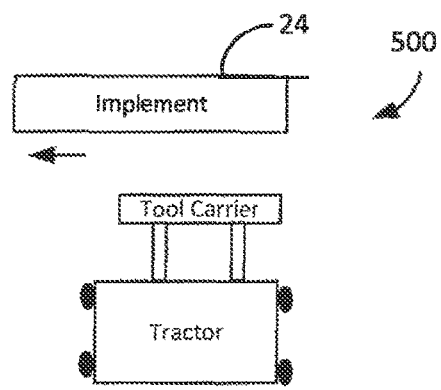
FIGS. 5A-5C are schematic top plan view diagrams showing situations of an implement being disposed laterally to the left, centered, and laterally to the right of a tool carrier of a tractor, respectively.
Figure 6A:
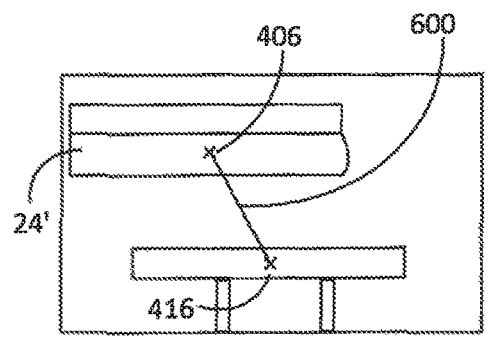
FIGS. 6A-6C are schematic illustrations of images of offset movement instructions displayed for providing visual movement instructions assisting an operator move the loader on the tractor shown in the situations of FIGS. 3A-3C, respectively, for coupling the implement with the tool carrier.
Figure 5B:
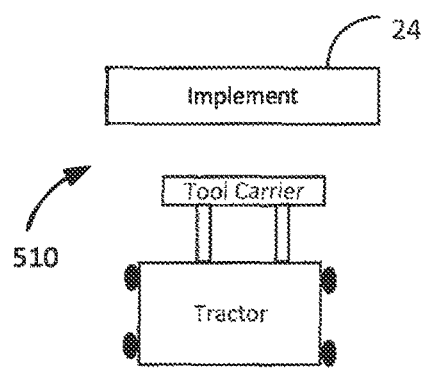
Figure 6B:
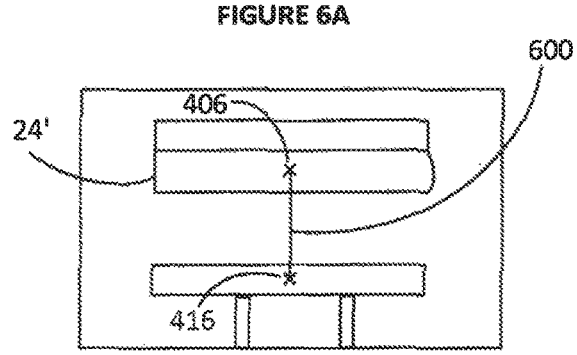
Figure 5C:
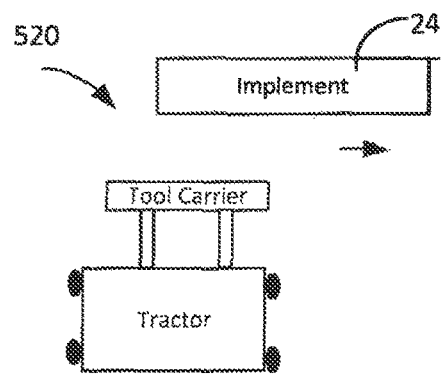
Figure 6C:
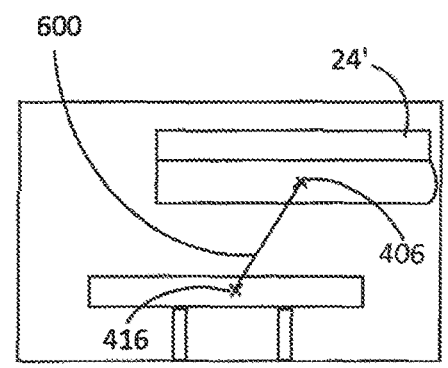

FIGS. 5A-5C are schematic top plan view diagrams showing situations of an implement being disposed laterally to the left, centered, and laterally to the right of a tool carrier of a tractor, respectively. FIGS. 6A-6C are schematic illustrations of images of offset movement instructions displayed for providing visual movement instructions assisting an operator move the tractor shown in the situations of FIGS. 5A-5C, respectively, for coupling the implement with the tool carrier.

In the first situation 500 shown in FIG. 5A, the implement 24 and the tool carrier 10 are laterally offset with the implement being located to the left of the tool carrier 10 from the point of view of the tractor operator. Accordingly, the virtual guidance apparatus 100 of the present disclosure is operative to generate the visual offset movement instruction 600 (FIG. 6A) on the screen superimposed on the viewable 24' image of the implement 24 with the visual offset movement instruction 600 extending at an angle to the left between the center point 406 of the attachment static line 400 on the image 24' of the implement and the center point 416 on the tool carrier static line 410 on the image 22' of the tool carrier 22. The visual offset movement instruction 600 extends in the example between the image 24' of the implement and the image 22' of the tool carrier 22. In an example embodiment, the degree of virtual angle of the visual offset movement instruction 600 relative to the tool carrier static line 410 on the image 22' of the tool carrier 22 represents an amount of physical left offset-ness of the implement 24 relative to the tool carrier 10.

In the second situation 510 shown in FIG. 5B, the implement 24 and the tool carrier 10 are not laterally offset relative to each other with the implement being located directly ahead of the tool carrier 10 from the point of view of the tractor operator. Accordingly, the virtual guidance apparatus 100 of the present disclosure is operative to generate the visual offset movement instruction 600 (FIG. 6B) on the screen superimposed on the viewable 24' image of the implement 24 with the visual offset movement instruction 600 extending at directly ahead such as at a right angle between the center point 406 of the attachment static line 400 on the image 24' of the implement and the center point 416 on the tool carrier static line 410 on the image 22' of the tool carrier 22. The visual offset movement instruction 600 extends in the example between the image 24' of the implement and the image 22' of the tool carrier 22. In an example embodiment, the lack of a virtual angle of the visual offset movement instruction 600 relative to the tool carrier static line 410 on the image 22' of the tool carrier 22 represents that the implement 24 and the tool carrier 10 are disposed without offset.

In the third situation 520 shown in FIG. 5C, the implement 24 and the tool carrier 10 are laterally offset with the implement being located to the right of the tool carrier 10 from the point of view of the tractor operator. Accordingly, the virtual guidance apparatus 100 of the present disclosure is operative to generate the visual offset movement instruction 600 (FIG. 6C) on the screen superimposed on the viewable 24' image of the implement 24 with the visual offset movement instruction 600 extending at an angle to the right between the center point 406 of the attachment static line 400 on the image 24' of the implement and the center point 416 on the tool carrier static line 410 on the image 22' of the tool carrier 22. The visual offset movement instruction 600 extends in the example between the image 24' of the implement and the image 22' of the tool carrier 22. In an example embodiment, the degree of virtual angle of the visual offset movement instruction 600 relative to the tool carrier static line 410 on the image 22' of the tool carrier 22 represents an amount of physical right offset-ness of the implement 24 relative to the tool carrier 10.

Figure 7A:
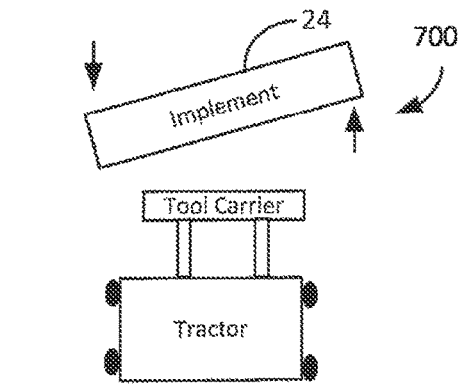
FIGS. 7A-7C are schematic top plan view diagrams showing situations of an implement being disposed in a right, centered, and left inclination angles relative to the tool carrier of the tractor, respectively.
Figure 7B:
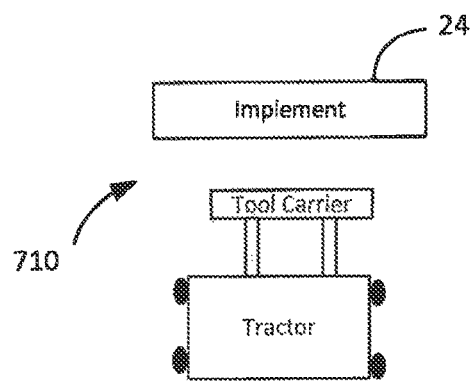
Figure 7C:
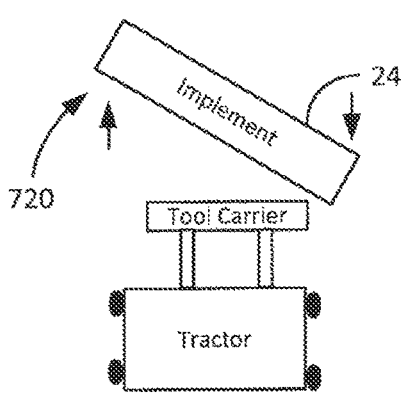

FIGS. 7A-7C are schematic top plan view diagrams showing situations of an implement being disposed in a right, centered, and left inclination angles relative to the tool carrier of the tractor, respectively. FIGS. 8A-8C are schematic illustrations of images of inclination movement instructions displayed for providing visual movement instructions assisting an operator to move the loader on the tractor shown in the situations of FIGS. 7A-7C, respectively, for coupling the implement with the tool carrier.

In the first situation 700 shown in FIG. 7A, the implement 24 is inclined relative to the tool carrier 22 wherein as shown in the example, the implement 24 is rotated in the vertical axis ("Y" in FIG. 1) relative to the tool carrier. In particular, the implement 24 is rotated to the left as viewed from above relative to the tool carrier 10. There is a positional mismatch between the interface portion of the tool carrier facing the interface portion of the implement. Accordingly, the virtual guidance apparatus 100 of the present disclosure is operative to generate the visual inclination movement instruction 800 (FIG. 8A) on the screen superimposed on the viewable 24' image of the implement 24 with the visual offset movement instruction 800 extending at a negative angle (below) relative to the attachment static line 400 on the image 24' of the implement. In an example embodiment, the degree of virtual angle 850 of the visual inclination movement instruction 800 relative to the attachment static line 400 on the image 10' of the implement 24 represents an incremental inclination movement for moving the loader relative to the implement about a vertical axis ("Y" in FIG. 1) perpendicular to the forward direction ("X" in FIG. 1) of the tractor for mutually coupling the carrier and implement attachment features. In the example embodiment, the logic is executed by the processor to dynamically display the visual offset movement instruction 800 on the screen 132 of the display unit 130 in parallel with the tool carrier static line 410 as the work vehicle carrying the tool carrier is moved by the operator for aligning the tool and carrier attachment features.

In the second situation 710 shown in FIG. 7B, the implement 24 is not inclined relative to the tool carrier 22 wherein as shown in the example, the implement 24 is aligned with the tool carrier. In particular, there is no positional mismatch between the interface portion of the tool carrier facing the interface portion of the implement. Accordingly, the virtual guidance apparatus 100 of the present disclosure is operative to generate the visual inclination movement instruction 800 (FIG. 8B) on the screen superimposed on the viewable 24' image of the implement 24 with the visual offset movement instruction 800 extending coincident with (or on) the attachment static line 400 on the image 24' of the implement. In an example embodiment, the degree of virtual angle 850 of the visual inclination movement instruction 800 relative to the attachment static line 400 on the image 10' of the implement 24 represents an incremental inclination movement for moving the loader relative to the implement about a vertical axis ("Y" in FIG. 1) perpendicular to the forward direction ("X" in FIG. 1) of the tractor for mutually coupling the carrier and implement attachment features. In the second situation 710 shown in FIG. 7B, the degree of virtual angle 850 of the visual inclination movement instruction 800 is zero.

In the third situation 720 shown in FIG. 7C, the implement 24 is inclined relative to the tool carrier 22 wherein as shown in the example, the implement 24 is rotated in the vertical axis ("Y" in FIG. 1) relative to the tool carrier. In particular, the implement 24 is rotated to the right as viewed from above relative to the tool carrier 10. There is a positional mismatch between the interface portion of the tool carrier facing the interface portion of the implement. Accordingly, the virtual guidance apparatus 100 of the present disclosure is operative to generate the visual inclination movement instruction 800 (FIG. 8C) on the screen superimposed on the viewable 24' image of the implement 24 with the visual offset movement instruction 800 extending at a positive angle (above) relative to the attachment static line 400 on the image 24' of the implement. In an example embodiment, the degree of virtual angle 850 of the visual inclination movement instruction 800 relative to the attachment static line 400 on the image 10' of the implement 24 represents an incremental inclination movement for moving the loader relative to the implement about a vertical axis ("Y" in FIG. 1) perpendicular to the forward direction ("X" in FIG. 1) of the tractor for mutually coupling the carrier and implement attachment features. In the example embodiment, the logic is executed by the processor to dynamically display the visual offset movement instruction 800 on the screen 132 of the display unit 130 in parallel with the tool carrier static line 410 as the work vehicle carrying the tool carrier is moved by the operator for aligning the tool and carrier attachment features.

Figure 9:
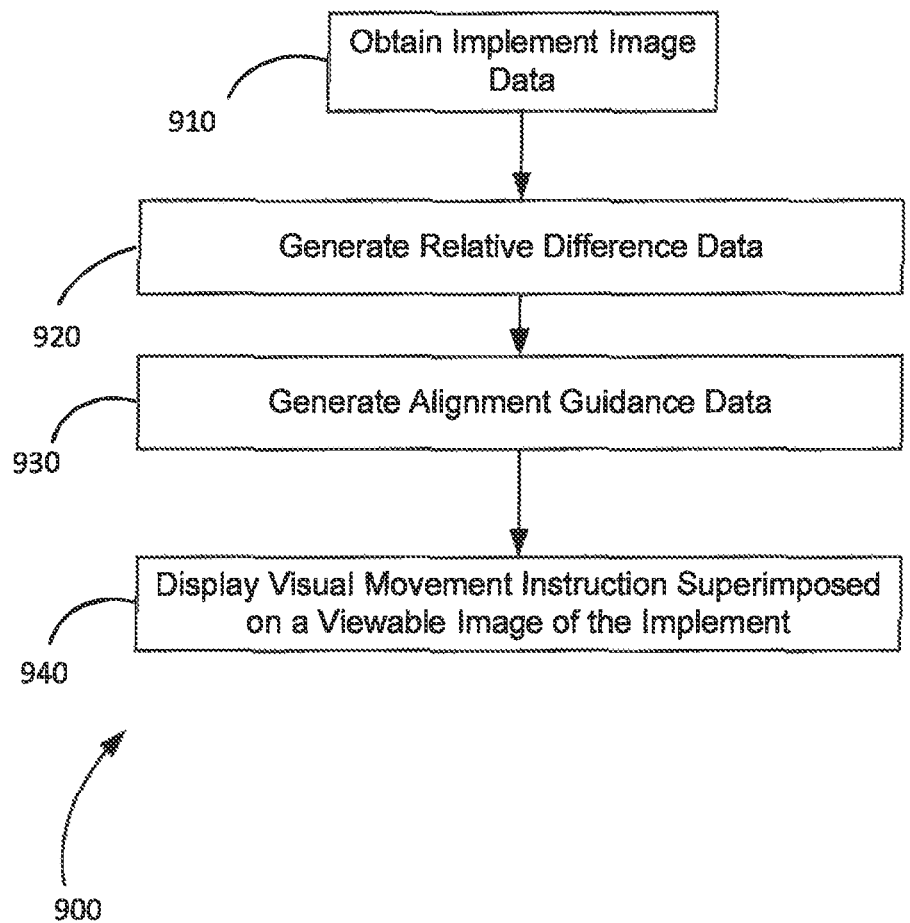
FIG. 9 is a flow diagram showing a virtual guidance method for assisting an operator of an associated work vehicle to move a loader of the vehicle for connection of a tool carrier of the loader with an implement.

FIG. 9 is a flow diagram showing a virtual guidance method 900 for assisting an operator of an associated work vehicle to move a loader of the vehicle for connection of a tool carrier of the loader with an implement.

In step 910, a camera device operatively coupled with a guidance control unit of a virtual guidance apparatus generates implement image data representative of an image of an implement adjacent to the work vehicle.

In step 920 relative difference data is generated based on the implement image data. The relative difference data is representative of a relative position between an implement attachment feature of the implement that is mutually coupleable with a corresponding carrier attachment feature of the tool carrier for coupling the tool carrier of the loader with the implement.

Alignment guidance data is generated in step 930 based on the relative difference data, wherein the alignment guidance data is representative of an incremental movement for moving the loader relative to the implement for mutually coupling the carrier and implement attachment features.

A visual movement instruction is displayed in step 940 superimposed on a viewable image of the implement. The visual movement instruction is based on the implement image data and the alignment guidance data. The provides instructions to an operator of the associated tractor for moving the loader relative to the implement for coupling the tool carrier of the loader with the implement.

It is to be understood that other embodiments will be utilized and structural and functional changes will be made without departing from the scope of the claims. The foregoing descriptions of embodiments have been presented for the purposes of illustration and description. It is not intended to be exhaustive or to limit the embodiments to the precise forms disclosed. Accordingly, many modifications and variations are possible in light of the above teachings. It is therefore intended that the scope of the claims not be limited by this detailed description.

The invention claimed is:

1. A virtual guidance apparatus for assisting movement of a loader carried on an associated tractor for connection of a tool carrier of the loader with an implement, the apparatus comprising:
   a guidance control unit comprising:
      a processor;
      a memory device operatively coupled with the processor; and
      logic stored in the memory device;
   a vision sensor device operatively coupled with the guidance control unit, the vision sensor device being operable to generate implement image data representative of an image of an implement adjacent to the tractor; and
   a display unit operatively coupled with the guidance control unit and comprising a screen that is viewable by an operator of the associated tractor,
   wherein the processor is operable to execute the logic to:
      determine, based on the implement image data, a virtual static line extending between spaced apart implement attachment features of the implement that are mutually coupleable with corresponding carrier attachment features of the tool carrier for coupling the tool carrier of the loader with the implement;

generate, based on the implement image data, relative difference data representative of a relative position between the spaced apart implement attachment features and the corresponding carrier attachment features, the relative difference data comprising offset angle data representative of a relative lateral angle between the implement attachment features and the carrier attachment features, and inclination angle data representative of a relative inclination angle between the tool carrier of the loader and the implement;

generate, based on the relative difference data, alignment guidance data representative of an incremental movement for moving the loader relative to the implement for mutually coupling the carrier and implement attachment features;

generate, based on the offset angle data, offset guidance data representative of an incremental lateral movement for laterally moving the loader relative to the implement in a direction perpendicular to a forward direction of the tractor for mutually coupling the carrier and implement attachment features; and generate, based on the inclination angle data, inclination guidance data representative of an incremental inclination movement for moving the loader relative to the implement about a vertical axis perpendicular to the forward direction of the tractor for mutually coupling the carrier and implement attachment features, wherein the display unit is operable to:

display on the screen, based on the implement image data, the virtual static line, and the alignment guidance data, a visual movement instruction superimposed on a viewable image of the implement displayed on the screen, the visual movement instruction extending in the viewable image of the implement displayed on the screen at an angle from the virtual static line providing instructions to the operator for moving the loader relative to the implement for mutually coupling the tool carrier of the loader with the implement; and display on the screen, based on the implement image data, the offset guidance data, and the inclination guidance data, a visual offset movement instruction and a visual inclination movement instruction, wherein the visual offset movement instruction extends at an angle corresponding to the relative lateral angle from a center point of the virtual static line to provide further instructions to the operator for moving the loader laterally in a horizontal plane relative to the implement for coupling the tool carrier with the implement in the horizontal plane, and wherein the visual inclination movement instruction extends at an angle corresponding to the relative inclination angle from an end point of the virtual static line to provide instructions to the operator for steering the tractor carrying the loader in the horizontal plane about the vertical axis relative to the implement for coupling the tool carrier with the implement in the vertical plane.

2. The virtual guidance apparatus according to claim 1, wherein:

the display unit is operable to display a viewable image of the loader;

the display unit is operable to display the visual offset movement instruction on a portion of the screen between the viewable image of the implement and the viewable image of the loader; and the display unit is operable to display the visual inclination movement instruction on the screen superimposed on the viewable image of the implement.

3. The virtual guidance apparatus according to claim 1, wherein:

the vision sensor device is operable to generate the implement image data, wherein the implement image data comprises implement attachment feature data representative of an image of the implement attachment features; and the processor is operable to execute the logic to:

automatically detect the implement attachment features of the implement relative to the vision sensor device based on the implement attachment feature data of the implement image data; and automatically generate, based on the automatically detected implement attachment features, the alignment guidance data representative of the incremental movement for moving the loader relative to the implement for mutually coupling the carrier and implement attachment features.

4. The virtual guidance apparatus according to claim 3, wherein:

the logic stored in the memory device comprises a deep learning detection model; and the processor is operable to execute the deep learning detection model to automatically detect the implement attachment features of the implement relative to the vision sensor device based on the implement attachment feature data of the implement image data.

5. The virtual guidance apparatus according to claim 1, wherein:

the guidance control unit comprises an implement database stored in the memory device, the implement database comprising a first implement data set correlating a first implement type of a first implement with first attachment feature location data representative of locations of physical implement attachment features of the first implement, and a second implement data set correlating a second implement type of a second implement with second attachment feature location data representative of locations of physical implement attachment features of the second implement;

the guidance control unit is operable to receive an implement identification signal, the implement identification signal being representative of an identity of the implement;

the processor is operable to execute the logic to:

select, based on the implement identification signal corresponding to a one of the first or second implement types, a corresponding one of the first or second implement data sets from the implement database; and automatically generate, based on the implement image data and on the first or second attachment feature location data corresponding to the selected one of the first or second implement data sets, the alignment guidance data representative of the incremental movement for moving the loader relative to the implement for mutually coupling the carrier and implement attachment features.

6. The virtual guidance apparatus according to claim 5, further comprising:

an operator interface operatively coupled with the guidance control unit, the operator interface being operable to receive an implement selection signal from an operator of the tractor, and to generate the implement identification signal corresponding to the received implement selection signal.

7. The virtual guidance apparatus according to claim 5, wherein:
the processor is operable to execute the logic to:
- detect, based on the implement image data, identification indicia carried on the implement;
- determine the detected indicia being representative of a one of the first or second implement types;
- select, based on the detected indicia being determined to be representative of a one of the first or second implement types, a corresponding one of the first or second implement data sets from the implement database; and
- automatically generate, based on the implement image data and on the first or second attachment feature location data corresponding to the selected one of the first or second implement data sets, the alignment guidance data representative of the incremental movement for moving the loader relative to the implement for mutually coupling the carrier and implement attachment features.

8. The virtual guidance apparatus according to claim 1, wherein:
the processor is operable to execute the logic to:
- detect, based on the implement image data, implement information indicia carried on the implement;
- determine, based on detecting the implement information indicia, attachment feature location data representative of locations of physical implement attachment features of the implement; and
- automatically generate, based on the implement image data and on the attachment feature location data, the alignment guidance data representative of the incremental movement for moving the loader relative to the implement for mutually coupling the carrier and implement attachment features.

9. A method in a virtual guidance apparatus for assisting movement of a loader carried on an associated tractor for connection of a tool carrier of the loader with an implement, the method comprising:
- generating by a vision sensor device operatively coupled with a guidance control unit of the virtual guidance apparatus implement image data representative of an image of an implement adjacent to the tractor;
- determining, based on the implement image data by a processor executing logic stored in a memory device of the guidance control unit, a virtual static line extending between spaced apart implement attachment features of the implement that are mutually coupleable with corresponding carrier attachment features of the tool carrier for coupling the tool carrier of the loader with the implement;
- generating based on the implement image data by the processor executing the logic stored in the memory device of the guidance control unit relative difference data, the relative difference data being representative of a relative position between the spaced apart implement attachment features and the corresponding carrier attachment features;
- generating based on the relative difference data by the processor executing the logic alignment guidance data, the alignment guidance data being representative of an incremental movement for moving the loader relative to the implement for mutually coupling the carrier and implement attachment features;
- generating the relative difference data by generating by the processor of the guidance control unit executing the logic offset angle data representative of a relative lateral angle between the implement attachment features and the carrier attachment features, and inclination angle data representative of a relative inclination angle between the tool carrier of the loader and the implement;
- generating, by the processor of the guidance control unit executing the logic based on the offset angle data, offset guidance data representative of an incremental lateral movement for laterally moving the loader relative to the implement in directions perpendicular to a forward direction of the tractor for mutually coupling the carrier and implement attachment features;
- generating, by the processor of the guidance control unit executing the logic based on the inclination angle data, inclination guidance data representative of an incremental inclination movement for moving the loader relative to the implement about a vertical axis perpendicular to the forward direction of the tractor for mutually coupling the carrier and implement attachment features;
- displaying, based on the implement image data, the virtual static line, and the alignment guidance data on a screen of a display unit operatively coupled with the guidance control unit of the virtual guidance apparatus, a visual movement instruction superimposed on a viewable image of the implement, wherein the visual movement instruction extends in the viewable image of the implement displayed on the screen at an angle from the virtual static line to provide instructions to an operator of the associated tractor for moving the loader relative to the implement for mutually coupling the tool carrier of the loader with the implement; and
- displaying on the screen of the display unit based on the implement image data, the offset guidance data, and the inclination guidance data, a visual offset movement instruction and a visual inclination movement instruction, wherein the visual offset movement instruction extends at an angle corresponding to the relative lateral angle from a center point of the virtual static line to provide instructions to the operator for moving the loader laterally in a horizontal plane relative to the implement for coupling the tool carrier with the implement in the horizontal plane, and wherein the visual inclination movement instruction extends at an angle corresponding to the relative inclination angle from an end point of the virtual static line to provide instructions to the operator for steering the tractor carrying the loader in the horizontal plane about the vertical axis relative to the implement for coupling the tool carrier with the implement in the vertical plane.

10. The method according to claim 9, wherein:
the displaying the visual offset movement instruction comprises displaying a viewable image of the loader and displaying the visual offset movement instruction on a portion of the screen between the viewable image of the implement and the viewable image of the loader; and
the displaying the visual inclination movement instruction comprises displaying the visual inclination movement instruction on the screen of the display unit superimposed on the viewable image of the implement.

11. The method according to claim 9, further comprising:
generating by the vision sensor device operatively coupled with the guidance control unit the implement image data comprising implement attachment feature data representative of an image of the implement attachment features;
automatically detecting by the processor executing the logic the implement attachment features of the implement relative to the vision sensor device based on the implement attachment feature data of the implement image data; and
automatically generating by the processor executing the logic, based on the automatically detected implement attachment features, the alignment guidance data representative of the incremental movement for moving the loader relative to the implement for mutually coupling the carrier and implement attachment features.

12. The method according to claim 11, wherein:
the automatically detecting the implement attachment feature of the implement relative to the vision sensor device comprises executing by the processor a deep learning model stored in the memory device of the control unit to automatically detect the implement attachment features relative to the vision sensor device based on the implement attachment feature data of the implement image data.

13. The method according to claim 9, further comprising:
storing an implement database in the memory device of the guidance control unit, the implement database comprising a first implement data set correlating a first implement type of a first implement with first attachment feature location data representative of locations of physical implement attachment features of the first implement, and a second implement data set correlating a second implement type of a second implement with second attachment feature location data representative of locations of one or more physical implement attachment features of the second implement;
receiving by the guidance control unit of the virtual guidance apparatus an implement identification signal, the implement identification signal being representative of an identity of the implement;
selecting, by the processor executing the logic based on the implement identification signal corresponding to a one of the first or second implement types, a corresponding one of the first or second implement data sets from the implement database; and
automatically generating by the processor executing the logic based on the implement image data and on the first or second attachment feature location data corresponding to the selected one of the first or second implement data sets, the alignment guidance data representative of the incremental movement for moving the loader relative to the implement for mutually coupling the carrier and implement attachment features.

14. The method according to claim 13, further comprising:
receiving by an operator interface operatively coupled with the guidance control unit an implement selection signal from an associated source; and
generating the implement identification signal corresponding to the received implement selection signal.

15. The method according to claim 13, further comprising:
detecting by the processor executing the logic based on the implement image data, identification indicia carried on the implement;
determining by the processor executing the logic the detected indicia being representative of a one of the first or second implement types;
selecting by the processor executing the logic based on the detected indicia being determined to be representative of a one of the first or second implement types, a corresponding one of the first or second implement data sets from the implement database; and
automatically generating by the processor executing the logic based on the implement image data and on the first or second attachment feature location data corresponding to the selected one of the first or second implement data sets, the alignment guidance data representative of the incremental movement for moving the loader relative to the implement for mutually coupling the carrier and implement attachment features.

16. The method according to claim 9, further comprising:
detecting by the processor executing the logic based on the implement image data, implement information indicia carried on the implement;
determining by the processor executing the logic based on detecting the implement information indicia, attachment feature location data representative of locations of physical implement attachment features of the implement; and
automatically generating by the processor executing the logic based on the implement image data and on the attachment feature location data, the alignment guidance data representative of the incremental movement for moving the loader relative to the implement for mutually coupling the carrier and implement attachment features.

17. The virtual guidance apparatus according to claim 1, wherein:
the display unit is operable to display on the screen, based on the implement image data, the alignment guidance data, and the virtual static line, an attachment static line superimposed on the viewable image of the implement displayed on the screen, the attachment static line extending between the spaced apart implement attachment features of the implement displayed in the viewable image of the implement, the visual movement instruction extending at an angle from the attachment static line in the viewable image of the implement displayed on the screen for providing the instructions to the operator for moving the loader relative to the implement for mutually coupling the tool carrier of the loader with the implement.

18. A virtual guidance apparatus for assisting movement of a loader carried on an associated tractor for connection of a tool carrier of the loader with an implement, the apparatus comprising:
a guidance control unit comprising:
a processor;
a memory device operatively coupled with the processor; and
logic stored in the memory device;
a vision sensor device operatively coupled with the guidance control unit, the vision sensor device being operable to generate implement image data representative of an image of an implement adjacent to the tractor; and
a display unit operatively coupled with the guidance control unit and comprising a screen that is viewable by an operator of the associated tractor,
wherein the processor is operable to execute the logic to:
determine, based on the implement image data, a virtual static line extending between spaced apart implement attachment features of the implement that are mutually coupleable with corresponding carrier attachment features of the tool carrier for coupling the tool carrier of the loader with the implement;

generate, based on the implement image data, relative difference data representative of a relative position between the spaced apart implement attachment features and the corresponding carrier attachment features, the relative difference data comprising offset angle data representative of a relative lateral angle between the implement attachment features and the carrier attachment features;

generate, based on the relative difference data, alignment guidance data representative of an incremental movement for moving the loader relative to the implement for mutually coupling the carrier and implement attachment features;

generate, based on the offset angle data, offset guidance data representative of an incremental lateral movement for laterally moving the loader relative to the implement in a direction perpendicular to a forward direction of the tractor for mutually coupling the carrier and implement attachment features, wherein the display unit is operable to:

display on the screen, based on the implement image data, the virtual static line, and the alignment guidance data, a visual movement instruction superimposed on a viewable image of the implement displayed on the screen, the visual movement instruction extending in the viewable image of the implement displayed on the screen at an angle from the virtual static line providing instructions to the operator for moving the loader relative to the implement for mutually coupling the tool carrier of the loader with the implement; and display on the screen, based on the implement image data and the offset guidance data, a visual offset movement instruction, wherein the visual offset movement instruction extends at an angle corresponding to the relative lateral angle from a center point of the virtual static line to provide instructions to the operator for moving the loader laterally in a horizontal plane relative to the implement for coupling the tool carrier with the implement in the horizontal plane.

\* \* \* \* \*